United States Patent [19]
Chui et al.

[11] Patent Number: 5,886,651
[45] Date of Patent: *Mar. 23, 1999

[54] SYSTEM AND METHOD FOR NESTED SPLIT CODING OF SPARSE DATA SETS

[75] Inventors: Charles K. Chui, Palo Alto; Rongxiang Yi, Sunnyvale, both of Calif.

[73] Assignee: Teralogic, Inc., Mountain View, Calif.

[*] Notice: The term of this patent shall not extend beyond the expiration date of Pat. No. 5,748,116.

[21] Appl. No.: 958,450

[22] Filed: Oct. 27, 1997

Related U.S. Application Data

[63] Continuation of Ser. No. 758,590, Nov. 27, 1996, Pat. No. 5,748,116.

[51] Int. Cl.[6] .................................................. H03M 7/00
[52] U.S. Cl. ................................................................ 341/50
[58] Field of Search ................................ 341/50, 70, 55, 341/59, 87

[56] References Cited

U.S. PATENT DOCUMENTS 5,748,116   5/1998   Chui et al. .................................. 341/50

Primary Examiner—Brian Young
Attorney, Agent, or Firm—Gary S. Williams; Flehr Hohbach Test Alberitton & Herbert LLP

[57] ABSTRACT

A data encoder and method successively analyzes successively smaller blocks of a specified data array. Data blocks are analyzed in a predefined order, and corresponding entries identifying data blocks containing at least one non-zero value are stored in that same order in a list of blocks. Whenever a data block is processed, if the data block is entirely filled with zero data it is so identified in the output data and no further processing of the subblock is required. Otherwise, if the size of the data block is greater than a predefined minimum block size (e.g., 2×2), the block is divided into smaller data blocks and those smaller data blocks are put on the list of blocks for further processing. Finally, if the size of a data block that is being processed is the predefined minimum block size, values representing all the data items in that data block are written into the output data. Information identifying the number of bits required to encode the maximum data value in each data block is written into the output data in the same order that the blocks are analyzed, thereby enabling a decoder procedure to determine the number of data bits used to encode each data value stored in the output data. A data decoder and method retraces the encoded data so as to reverse the process performed by the encoding method. The encoder and decoder can be implemented in either hardwired logic or computer software.

22 Claims, 14 Drawing Sheets

| 0,0 | Block:(0,0,1) | Block:(0,2,1) | | Block:(0,4,2) | | | | Block:(0,8,3) | | | | | | | |
|---|---|---|---|---|---|---|---|---|---|---|---|---|---|---|---|
| -14 | 5 | 1 | 0 | 0 | 0 | 0 | 0 | 2 | 1 | -1 | 0 | 1 | 0 | 0 | 0 |
| 16 | -2 | 3 | -1 | 0 | 0 | 0 | -1 | -1 | 1 | 0 | 0 | 0 | 0 | 0 | 0 |
| -2 | 0 | 0 | 0 | 1 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | -1 | 0 | 0 |
| 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |
| 1 | 2 | 0 | 0 | 0 | 0 | 0 | 0 | 0 | 0 | 0 | 0 | 0 | 0 | 0 | 0 |
| 0 | -1 | 3 | 0 | 0 | 0 | 0 | 0 | 0 | 0 | 0 | 0 | 0 | 0 | 0 | 0 |
| -2 | 0 | 8 | -11 | 8 | 0 | 0 | 0 | 0 | 0 | 0 | 0 | 0 | 0 | 0 | 0 |
| 3 | 1 | -15 | 16 | -19 | 5 | -1 | 0 | 0 | 1 | 1 | 0 | 0 | 1 | 0 | 0 |
| -9 | 9 | 1 | -7 | 4 | -9 | 6 | -1 | 0 | 0 | 0 | 0 | 1 | -1 | 0 | 0 |
| -3 | 1 | 0 | 0 | 0 | 10 | 0 | 5 | 0 | 0 | 0 | 0 | 0 | 3 | -3 | -1 |
| -3 | 0 | -2 | -3 | 2 | -6 | 29 | -14 | 5 | 0 | 0 | 0 | 1 | 0 | 0 | 0 |
| 2 | 0 | -1 | 1 | 1 | 0 | -6 | 3 | -5 | 0 | 0 | 0 | 0 | 0 | 1 | 0 |
| 0 | 2 | 0 | -1 | 1 | 1 | 0 | 1 | -1 | 2 | 0 | 0 | 0 | 0 | 7 | -14 |
| 0 | -3 | 3 | 0 | -4 | -1 | 2 | -2 | 6 | -3 | 2 | 0 | 0 | 12 | -33 | 36 |

15,0  Block:(8,0,3)  Block:(8,8,3)

FIG. 6

SYSTEM AND METHOD FOR NESTED SPLIT CODING OF SPARSE DATA SETS

This application is a continuation of Ser. No. 08/758,590, filed Nov. 27, 1996, now U.S. Pat. No. 5,748,116.

The present invention relates generally to systems and methods for lossless compression and reconstruction of data, such as the quantized wavelet coefficients of a wavelet transformed image, that is sparsely populated by non-zero data, and particularly to a system and method for efficiently identifying and encoding portions of a data set occupied by zero and near-zero values.

BACKGROUND OF THE INVENTION

Sparsely populated data sets are utilized in numerous technical fields. The present invention was developed for efficiently encoding image data that has been transformed by successive applications of wavelet transforms, but is equally applicable to other types of sparsely populated data sets. Image data that has been transformed by successive applications of wavelet transforms tends to have large portions occupied by zero and near-zero values, especially if the data is subjected to a data quantization step prior to encoding.

The primary goals of the present invention are to provide an encoding methodology that (A) efficiently locates subarrays that are entirely occupied by zero data and encoding such subarrays with as few data bits as possible, (B) determines the maximum number of data bits required to encode subarrays that include at least some non-zero data, and (C) encodes non-zero data with the minimum number of data bits required to losslessly store such data.

Other goals of the present invention are to provide an encoding methodology that is computationally very efficient, and one that is suitable for implementation in hardware (i.e., electronic circuitry).

SUMMARY OF THE INVENTION

In summary, the present invention is a system and method for encoding an array of data. The data encoding method successively analyzes successively smaller blocks of a specified data array. Data blocks are analyzed in a predefined order, and corresponding entries identifying data blocks containing at least one non-zero value are stored in that same order in a list of blocks. Whenever a data block is processed, if the data block is entirely filled with zero data it is so identified in the output data and no further processing of the data block is required. Otherwise, if the size of the data block is greater than a predefined minimum block size (e.g., 2×2), the block is divided into smaller data blocks and those smaller data blocks are put on the list of blocks for further processing. Finally, if the size of a data block that is being processed is the predefined minimum block size, values representing all the data items in that data block are written into the output data. Information identifying the minimum number of bits required to encode the largest data value in each data block is written into the output data in the same order that the blocks are analyzed, thereby enabling a decoder procedure to determine the number of data bits used to encode each data value stored in the output data.

The data decoding method retraces the encoded data so as to reverse the process performed by the encoding method. The bits of the encoded data are read, in order, in a single pass from the first bit to the last. When the last data bit in the encoded data has been processed, reconstruction of the encoded data array is complete. As the encoded data is read, entries are added to a block list to identify data blocks that will be processed later, along with the data indicating the maximum number of bits needed to encode the data in those data blocks. Data blocks are analyzed in the order they appear in the encoded data. Whenever a data block is processed, if the data block is entirely filled with zero data, the relevant portion of the reconstructed data array is filled with zero data values. Otherwise, data block identifiers are added to the block list until data blocks of a predetermined minimum size (e.g., 2×2) are encountered, at which point the data values in each such data block are decoded and output to the reconstructed data array.

BRIEF DESCRIPTION OF THE DRAWINGS

Additional objects and features of the invention will be more readily apparent from the following detailed description and appended claims when taken in conjunction with the drawings, in which:

FIG. 6 is a sample array of data used for demonstrating the operation of the first preferred embodiment the present invention.

DESCRIPTION OF THE PREFERRED EMBODIMENTS

Figure 1:
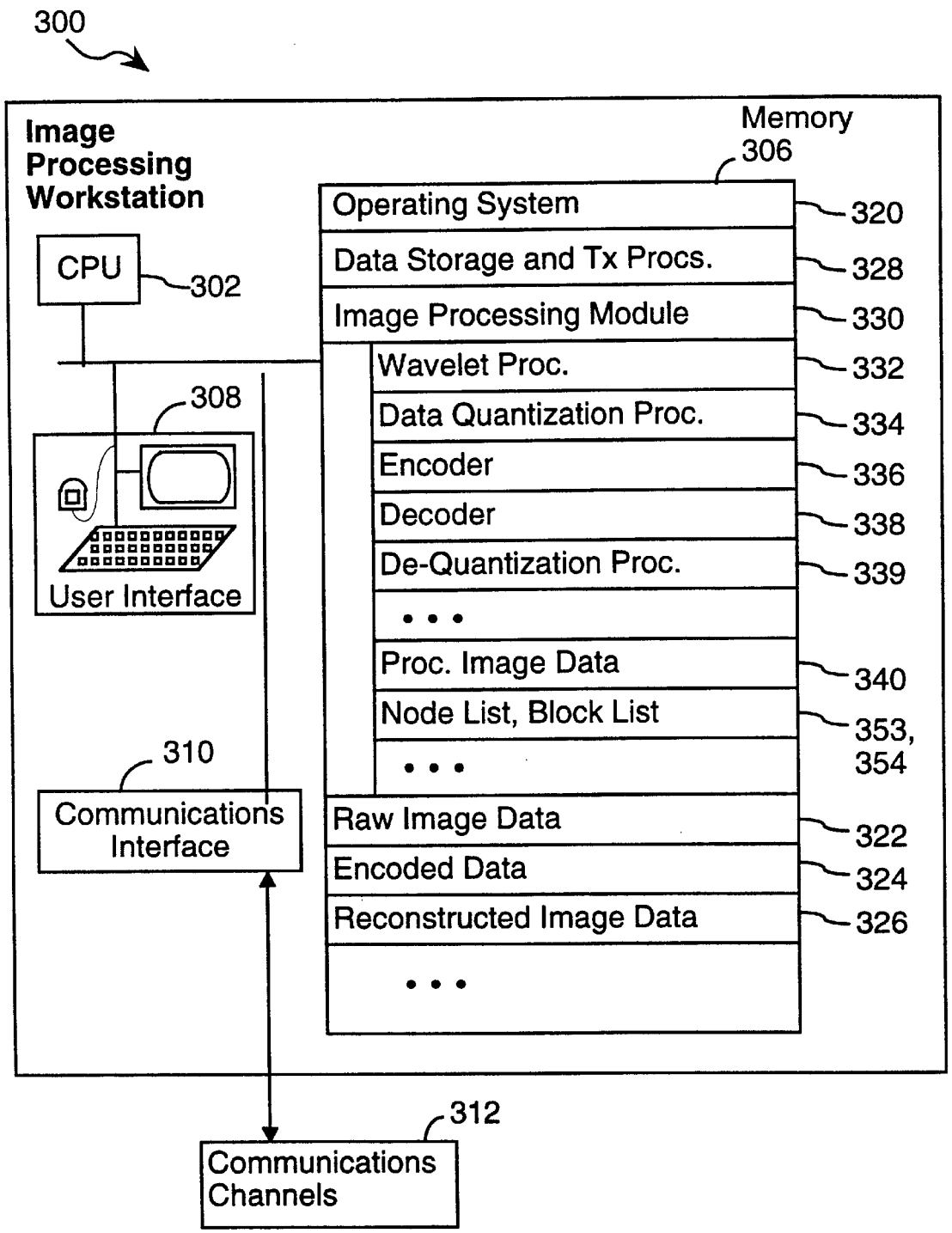
FIG. 1 is a block diagram of an image processing workstation incorporating a first preferred embodiment of the present invention.

Referring to FIG. 1, there is shown a computer system or workstation 300 that incorporates a first preferred embodiment of the present invention. The system 300 includes a central processing unit 302, internal system, control and data busses 304, memory 306 (including random access memory as well as non-volatile memory such as magnetic disk storage), a user interface 308, and a communications interface 310 for transferring information to and from other devices via one or more communication channels 312.

Memory 306 stores both computer software and data, including:

an operating system 320 raw image data 322, such as image data files generated by a digital camera, CAT scan device, MR imaging system, or an image scanner;

encoded data 324, such as compressed image data files generated by a data encoder or data encoding procedure;

reconstructed image data 326, such as reconstructed image data files generated by a data decoder and wavelet data reconstruction procedure; and procedures 328 for managing the storage, transmission and receipt of data files;

an image processing module 330 for processing image data.

In the first preferred embodiment, the image processing module 330 includes:

a wavelet procedure 332 for transforming arrays of data using wavelet transforms into wavelet analyzed data, and vice versa;

a data quantization procedure 334 for quantizing the wavelet analyzed data (also known as wavelet coefficients) produced by the wavelet procedure 332;

an encoder procedure 336 for encoding an array of data;

a decoder procedure 338 for decoding a set of encoded data into a corresponding data array;

a data de-quantization procedure 339 for remapping quantized wavelet coefficients back into wavelet coefficients;

processed image data files or storage arrays 340 for temporarily storing wavelet analyzed data or decoded data; and node list and block list data structures 353, 354 for storing data utilized by the encoder and decoder procedures 336, 338.

As indicated above, the present invention is suitable for use with any sparsely populated data set. For the purposes of explaining the operation of the encoder and decoder procedures, the specific type of wavelet transform procedure 332 used and the specific type of data quantization procedure 334 used to transform an image file into a processed image data file are not relevant and therefore are not further described herein. However, a preferred embodiment of the wavelet transform procedure 332 and the data quantization procedure 334 are described in U.S. patent application Ser. No. 08/xxx,xxx, filed xx, 1996, "System and Method for Performing Wavelet and Inverse Wavelet Like Transformations of Digital Data Using Only Add and Bit Shift Arithmetic Operations," which is hereby incorporated by reference as background information.

Figure 2:
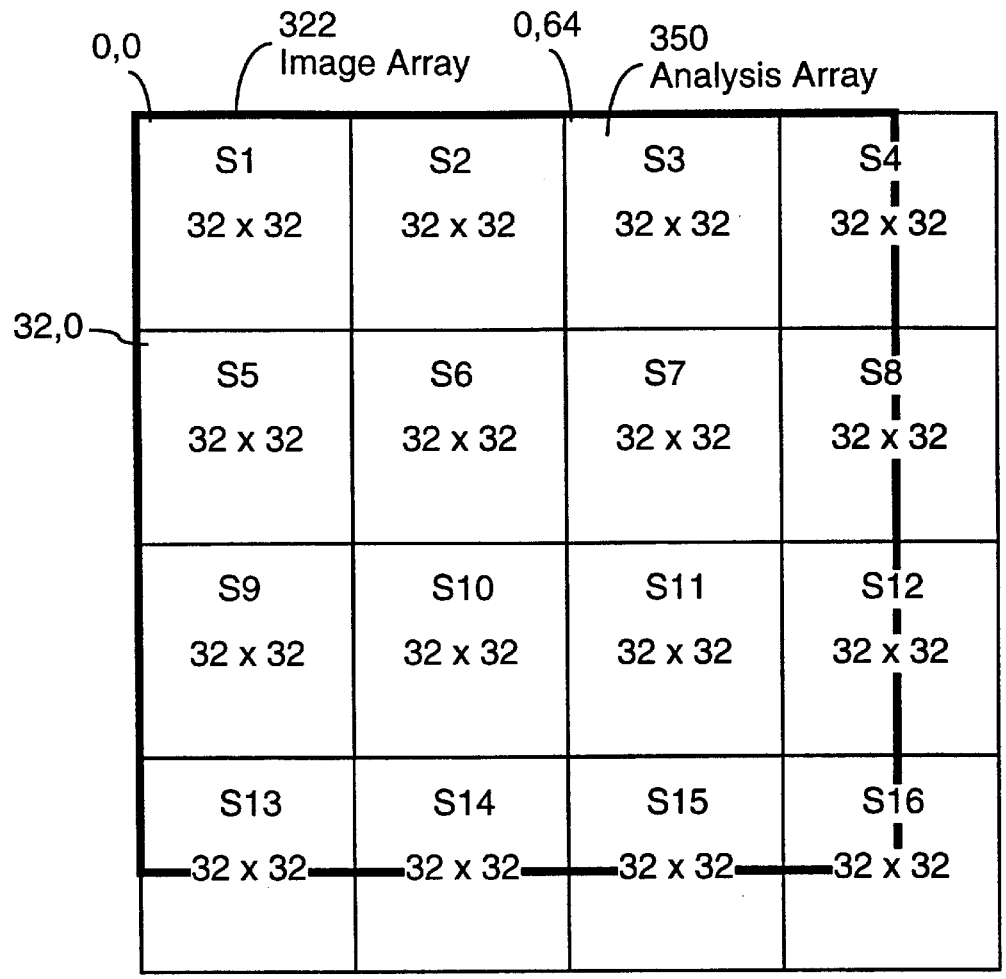
FIG. 2 schematically represents an image data array and an overlapping set of data analysis arrays.

Referring to FIG. 2, there is shown a data array 322 of image data (thick outline), and superimposed thereon is a set of sixteen "analysis arrays" 350. Each analysis array 350 is a square N×N array, such as a 32×32 array. A sufficient number of analysis arrays are used to cover the entire data array 322 that is to be encoded, even if some of the analysis arrays overhang the edges of the data array. The overhanging portions of the analysis arrays are filled with zero data values during the data encoding process. An analysis array size of 32×32 is convenient because an 11×9 set of such analysis arrays perfectly covers a 352×288 data array, which is a fairly commonly used image data array size. In the preferred embodiment, the origin of the data array is the top left corner, the first coordinate used to identify data array positions is the "Y" axis or vertical coordinate, and the second coordinate used is the "X" axis or horizontal coordinate. Thus, a position of 0,64 indicates a pixel at the top vertical position of the array, 64 pixel positions over to the right from the array origin, while a position of 32,0 indicates a pixel on the left edge of the array, 32 pixel positions vertically down from the array origin.

Figure 3A:
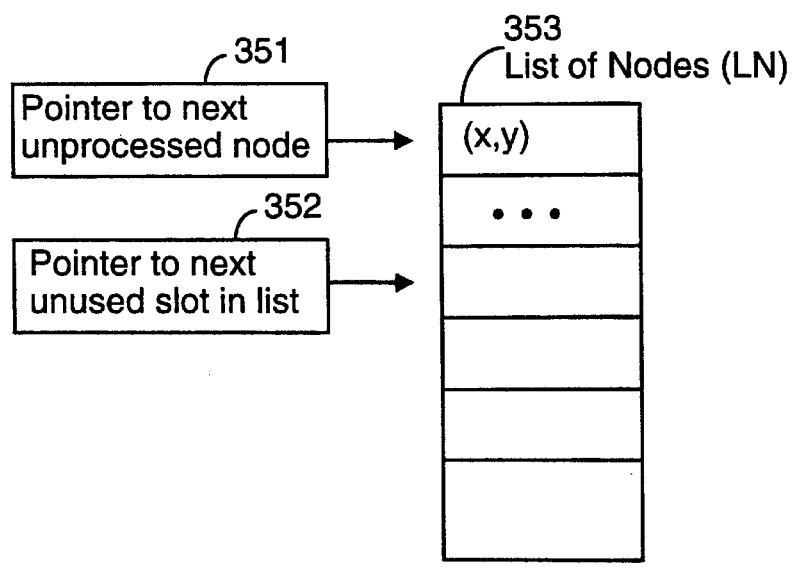
FIGS. 3A and 3B depict node list and block list data structures used by the data encoder and data decoder of the preferred embodiments.
Figure 3B:
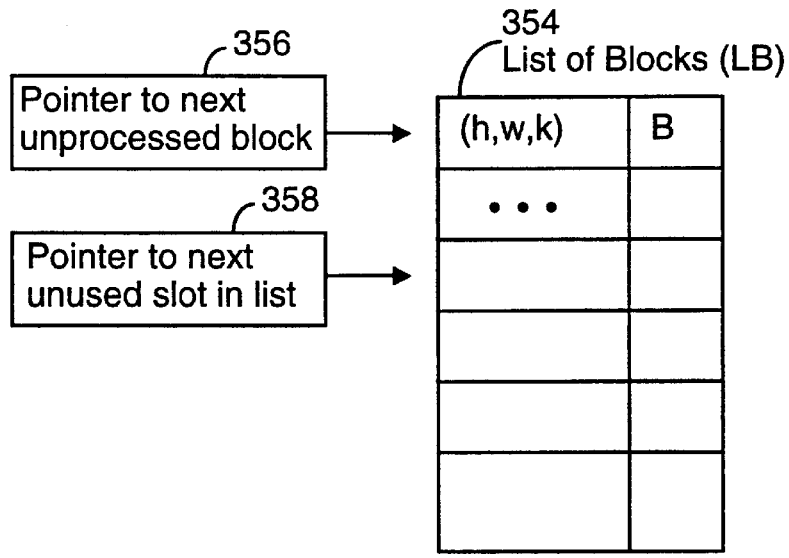

Referring to FIGS. 3A and 3B, the main "bookkeeping" data structures used by the encoder and decoder procedures are shown. In particular, a node list data structure 353 lists nodes (in the data array) being analyzed, and a block list data structure 354 lists data blocks (i.e., subarrays of data) being analyzed. The node list 353, which is used only in the second preferred embodiment stores a node identifier (i.e., x and y coordinates) for each node in the list. The block list 354 stores two items for each data block: (A) a block identifier consisting of two values indicating the origin of the data block and a value indicating the height and width of the data block, and (B) a value indicating the maximum number of bits required to represent any data value in the data block (i.e., int($\log_2 V$)+1, where "int( )" represents the integer portion of a specified value). In addition, each list 353, 354 has a respective a first pointer 351, 356 that points to the node or block highest in the list 351, 354 that has not yet been processed, and a second pointer 352, 358 that points to the highest unused slot in the list 353, 354.

Encoder Procedure

Figure 4:
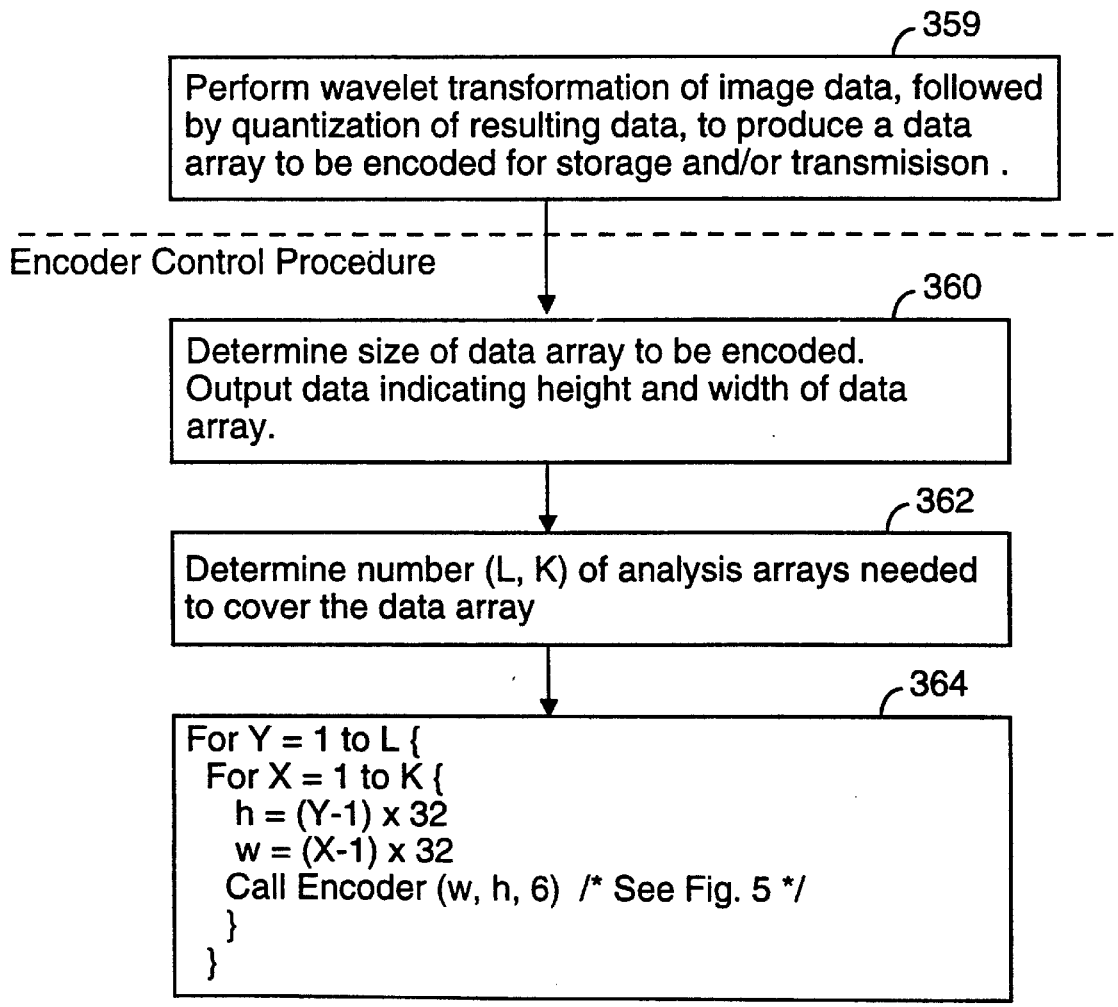
FIGS. 4 and 5 are flow charts of a preferred embodiment of the data encoding method of the present invention.

Referring to FIG. 4, prior to execution of the encoder procedure 336, one or more data preparation procedures will typically be performed (step 359). In the preferred embodiments, data preparation consists of performing a wavelet transformation (using wavelet procedure 332) of an image data array, followed by quantization (using data quantization procedure 334) of the resulting data to a predefined set of discrete data values. The wavelet transformation and quantization data preparation steps typically generate a data array sparsely populated with non-zero data. However, the encoder procedure is suitable for encoding virtually any data array, including three-dimensional and N-dimensional data arrays.

Figure 5:
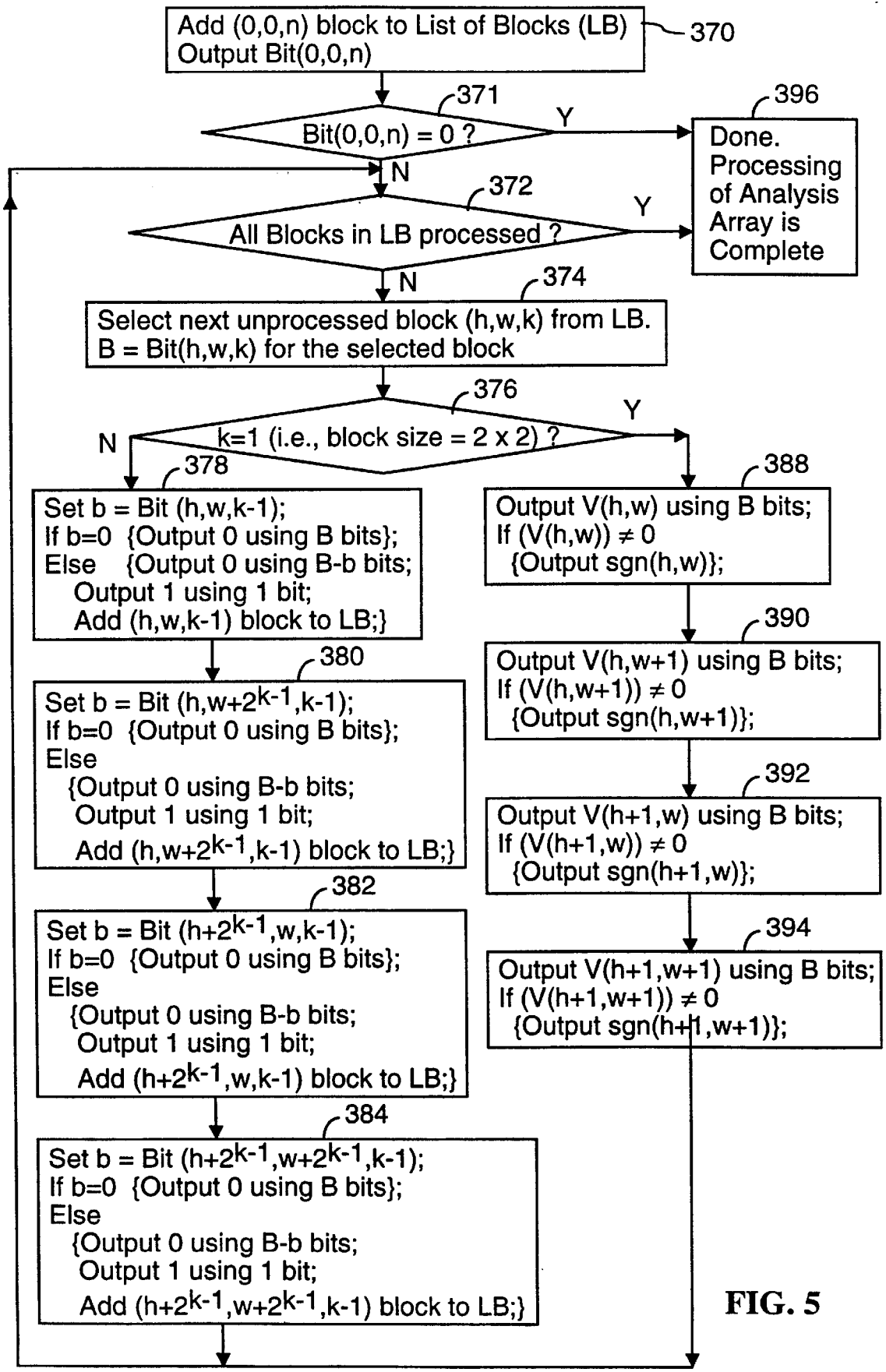

Referring to FIGS. 4 and 5, the encoder procedure 336 works, in general, by analyzing successively smaller blocks of a specified data array. Data blocks are analyzed in the order they appear in the list of blocks 354. Whenever a data block is processed, if the data block is determined to be entirely filled with zero data (i.e., data values all equal to zero, also called null data) it is so identified in the output data and no further processing of the data block is required. Otherwise, if the size of the data block is greater than 2×2, the data block is divided into four smaller subblocks and those four smaller subblocks are put on the list of blocks for further processing. Finally, if the size of a data block that is being processed is 2×2, four values representing the four data items in the block are written into the output data. Information about the number of bits required to encode the maximum data value in each data block is written into the output data in the same order that the blocks and their subblocks are analyzed, thereby enabling a decoder procedure to determine the number of data bits used to encode each data value stored in the output data.

Referring to FIG. 4, the encoder procedure begins by determining the height and width of the specified data array to be encoded and outputting those values to the output file (step 360), and then determining the number of analysis arrays needed to cover the specified data array. For example, when using a 32×32 analysis array, the number of analysis arrays needed may be determined by truncating the five least significant bits from the values of "31+data array height" and "31+data array width". In some applications the height and width may be permanently fixed, in which case steps 360 and 362 may be omitted. Then, an analysis array encoder procedure is called successive times to encode each of the analysis arrays required to cover the specified data array (step 364).

Table 1 provides definitions of terms and abbreviations used in the flow chart figures.

TABLE 1

Definitions of Terms used in Flow Chart Figures

| | |
|---|---|
| node | a single particular position in a data array |
| (h,w,k) | this represents a data block whose origin is at y,x = (h,w) and that extends vertically and horizontally $2^k$ positions. |
| V(h,w,k) | Maximum absolute value of all nodes in the (h,w,k) block |
| LB | List of blocks data structure |
| V(i,j) | the value of the (i,j) node |
| sgn(i,j) | the sign of the data value at the (i,j) node |
| Bit(h,w,k) | the maximum number of bits required to encode the absolute value of any data value in the block (i.e., int($\log_2$V) + 1, where "int()" represents the integer portion of a specified value) |
| (h,w,k)'s subblocks nodes of | (h,w,k − 1), (h,w + $2^{k-1}$,k − 1), (h + $2^{k-1}$,w,k − 1), (h + $2^{k-1}$,w + $2^{k-1}$,k − 1) |
| (h,w,1) | (h,w), (h,w + 1), (h + 1,w) (h + 1,w + 1) |

Referring to FIG. 5, the procedure for encoding an array of $2^n \times 2^n$ data values begins by putting a first entry, representing the entire $2^n \times 2^n$ analysis array, in the list of blocks (step 370). The list of blocks is empty except for this first entry. Also, at step 370 the encoding procedure determines the value of Bit(O,O,n), which is equal to the maximum number of bits required to encode any data value in the entire array being analyzed, and outputs that value using a predefined number of bits (e.g., 4 bits). If Bit(O,O,n) is equal to zero (step 371), that indicates that all the nodes in the array to be encoded are equal to zero, and therefore the encoding procedure is complete (step 396).

If at least one block listed in the block list has not yet been processed (step 372), which is obviously the case at the beginning of the encoder procedure, the procedure selects the next unprocessed data block (h,w,k) from the block list and sets a variable B equal to the maximum number of bits required to encode any data value in the selected data block (step 374).

If the size of the selected data block is not equal to or smaller than a predefined minimum block size, such as 2×2 (step 376), the following steps are performed for each of the four subblocks of the selected block. The variable b is set equal to the maximum number of bits required to encode any data value in the subblock. If b=0, that means that all values in the subblock are equal to zero, in which case a value of 0 is output using B bits. (B is the maximum number of bits required to encode any data value in the parent data block.) Otherwise, if b is not equal to 0, then (A) a value of 0 is output using B-b bits, (B) a value of 1 is output using 1 bit, and (C) the subblock is added to the block list (step 378). Note that the entry in the block list includes the value b to indicate the maximum number of bits required to encode the data in the subblock. Thus, if a subblock is not all zero data, then the maximum number of bits required to encode data in the subblock is determined and that value is both stored in the block list (or in a parallel data array) and output as a corresponding sequence of 0's terminated with a 1 bit. This process is then repeated for the other three subblocks of the selected block (steps 380, 382, 384). After all subblocks of the selected block have been processed by steps 378–384, the pointer 356 to the next processed block (see FIG. 3) will be advanced by one position at step 374 if there are any unprocessed data blocks left in the block list (step 372).

If the size of the selected block is the predetermined minimum block size, such as 2×2, (step 376), all the data values in the block are encoded and output as follows. Each data value is output using B bits, where B is the number of bits denoted in the block list for this block, and is equal to the maximum number of bits used by any data value in the selected block. For each data value not equal to zero, a sign bit is also output (steps 388, 390, 392, 394).

The above described procedure continues until all the blocks in the block list have been processed (step 372), at which point the encoding of the data analysis array is complete (step 396).

FIG. 6 shows an example of sparsely populated 16×16 data array. Table 2 shows the data output while encoding this data array using the procedure shown in FIG. 5.

TABLE 2

Output Data Generated by Encoder

| Output Data | Explanation |
|---|---|
| | (0,0,4) is the selected block |
| 0110 | Step 370. The largest absolute value of any datum in the entire array requires six bits to be encoded. This value, 6, is encoded using & predefined number of bits (e.g., 4 bits). |
| 01 | Step 378. b = Maxbit for block (0,0,3) = 5. The number of 0 bits output is 1 (B − b = 6 − 5) followed by a 1 bit. |
| 00001 | Step 380. b = maxbit for block (0,8,3) = 2. The number of 0 bits output is 4 (B − b = 6 − 2) followed by a 1 bit. |
| 01 | Step 382. b = maxbit for block (8,0,3) = 5. The number of 0 bits output is 4 (B − b = 6 − 2) followed by a 1 bit. |
| 1 | Step 384. b = maxbit for block (8,8,3) = 6. The number of 0 bits output is 0 (B − b = 6 − 6) followed by a 1 bit. |
| | (0,0,3) is the selected block. B = 5 |
| 1 | Step 378. b = Maxbit for block (0,0,2) = 5. The number of 0 bits output is 0 (B − b = 5 − 5) followed by a 1 bit. |
| 00001 | Step 380. b = maxbit for block (0,4,2) = 1. The number of 0 bits output is 4 (B − b = 5 − 1) followed by a 1 bit. |
| 0001 | Step 382. b = maxbit for block (4,0,2) = 2. The number of 0 bits output is 3 (B − b = 5 − 2) followed by a 1 bit. |
| 00000 | Step 384. b = maxbit for block (4,4,2) = 0. The number of 0 bits output is 5 (B − b = 5 − 0). |
| | (0,8,3) is the selected block. B = 2 |
| 1 | Step 378. b = Maxbit for block (0,8,2) = 2. The number of 0 bits output is 0 (B − b = 2 − 2) followed by a 1 bit. |
| 01 | Step 380. b = maxbit for block (0,12,2) = 1. The number of 0 bits output is 1 (B − b = 2 − 1) followed by a 1 bit. |
| 00 | Step 382. b = maxbit for block (4,8,2) = 0. The number of 0 bits output is 2 (B − b = 2 − 0). |
| 01 | Step 384. b = maxbit for block (12,12,2) = 1. The number of 0 bits output is 1 (B − b = 2 − 1) followed by a 1 bit. |
| . . . | The output data for several data blocks is not shown. |
| | (0,0,1) is the selected block. B = 5 |
| 01110 1 | Step 388. Output 5 bits equal to abs(−14). Output 1 bit, 1, as sign of −14. |
| 00101 0 | Step 390. Output 5 bits equal to abs(5). Output 1 bit, 0, as sign of 5. |
| 10000 0 | Step 392. Output 5 bits equal to abs(16). Output 1 bit, 0, as sign of 16. |
| 00010 1 | Step 394. Output 5 bits equal to abs(−2). Output 1 bit, 0, as sign of −2. |
| . . . | The output data for the remaining data blocks is not shown. |

Decoder Procedure

Figure 7:
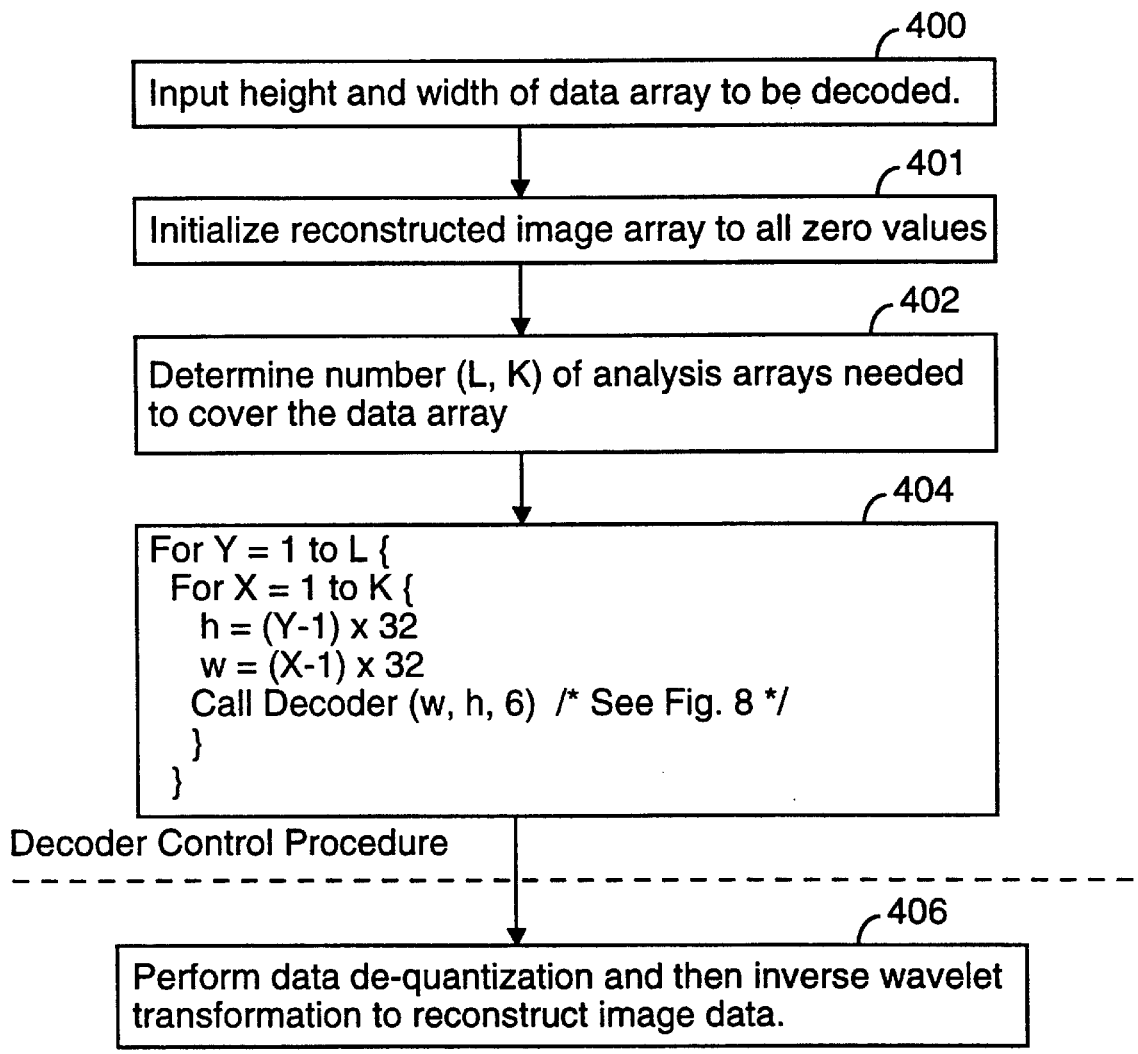
FIGS. 7 and 8 are flow charts of a preferred embodiment of the data decoding method of the present invention.
Figure 8:
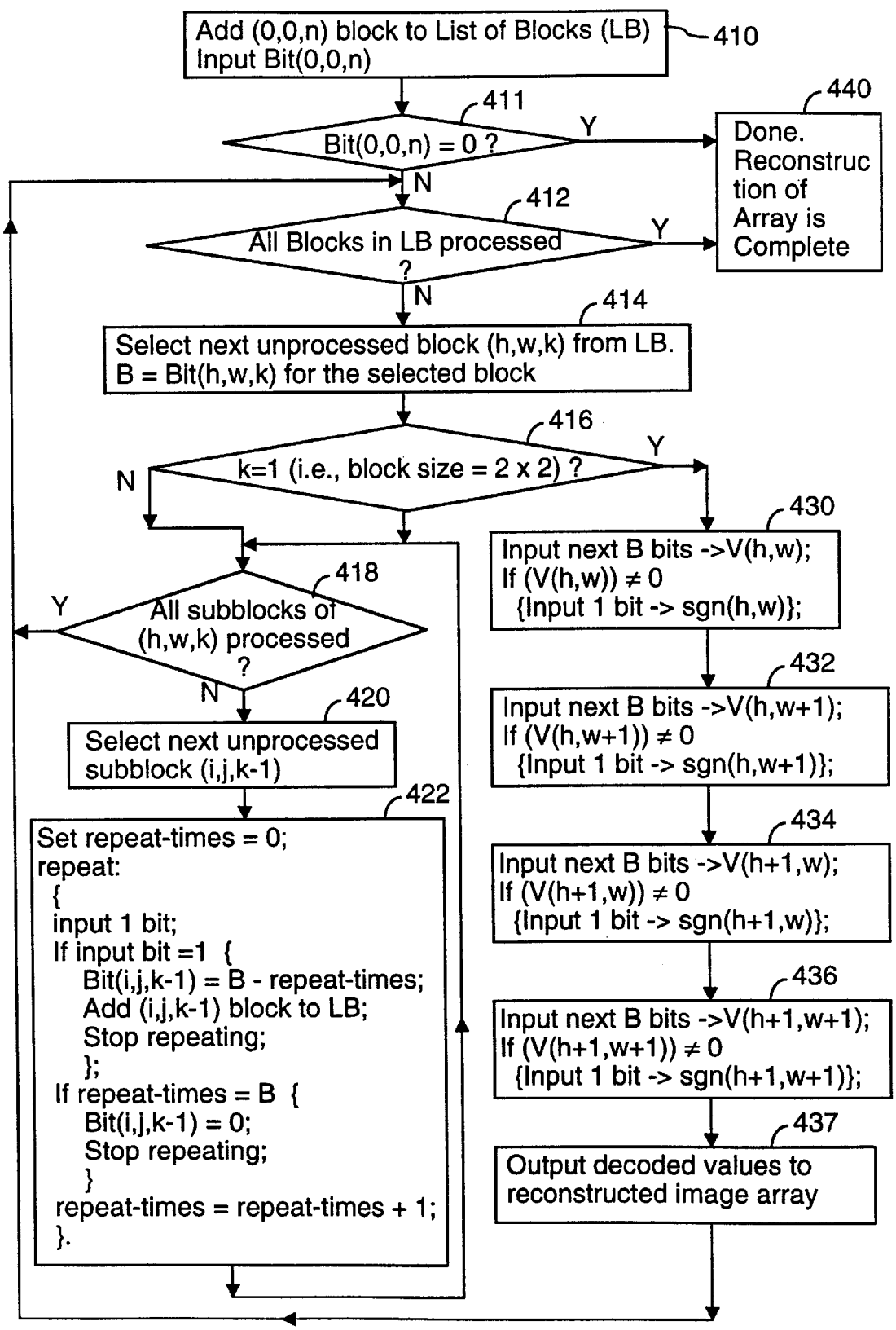

Referring to FIGS. 7 and 8, the decoder procedure 336 works, in general, by reading and interpreting the encoded data so as to reverse the process performed by the encoder procedure 336. The bits of the encoded data are read, in order, in a single pass from the first bit to the last. When the last data bit in the encoded data has been processed, reconstruction of the encoded data array is complete.

As the encoded data is read, entries are added to the block list to identify the data blocks and subblocks that will be processed later in the procedure, along with the data indicating the maximum number of bits needed to encode the data in those blocks and subblocks. Data blocks and subblocks are analyzed in the order they appear in the encoded data. Whenever a subblock is processed, if the subblock is entirely filled with zero data (i.e., data values all equal to zero), the relevant portion of the reconstructed data array is filled with zero data values. Otherwise, subblock identifiers are added to the block list until subblocks whose size is 2×2 are encountered, at which point the four values in the subblock are decoded and output to the reconstructed data array.

Referring to FIG. 7, the decoder procedure begins by reading (inputting) from the encoded data the height and width of the data array to be decoded and reconstructed (step 400), initializing the reconstructed image array to all zero values (step 401), and then determining the number of analysis arrays needed to cover the specified data array (step 402). Then, an analysis array decoder procedure (shown in FIG. 8) is called successive times to decode each of the analysis arrays required to cover the specified data array (step 404). After the decoding process is complete, the resulting reconstructed data may be subjected to a post-processing procedure (step 406), such as a reverse wavelet transformation procedure so as to reconstruct an image file.

Referring to FIG. 8, the procedure for decoding a set of encoded data representing an array of $2^n \times 2^n$ data values begins by putting a first entry, representing the entire $2^n \times 2^n$ analysis array, in the list of blocKs (step 410). The list of blocks is empty except for this first entry. Also, at step 410 the decoding procedue inputs a "bit length value", Bit(0,0, n), having a predefined number of bits (e.g., 4 bits) that represents the maximum number of bits used to encode any data value in the entire array being decoded. This bit length value is stored in the block list in the entry representing the entire analysis array. If the bit length value, Bit(O,O,n), is equal to zero (step 411), that indicates that all the nodes in the array to be decoded are equal to zero, and therefore the decoding procedure is complete (step 440).

If at least one block listed in the block list has not yet been processed (step 412), which is obviously the case at the beginning of the decoder procedure, the procedure selects the next unprocessed block (h,w,k) from the block list and reads from the block list a value B equal to the maximum number of bits required to encode any data value in the block (step 414).

If the size of the selected block is not a predefined minimum block size, such as 2×2 (step 416), the following steps are performed for each of the four subblocks of the selected block. Steps 418 and 420 are used to select each successive subblock and to exit the loop when all four subblocks have been processed. For each subblock, the encoded data bits are read until either a 1 bit is encountered or B bits are read without reading a 1 bit. The variable "repeat-times" keeps track of how many 0 bits have been read. If a 1 bit is read before repeat-times reaches a value of B, the subblock is added to the block list and a value of "B-repeat-times" is stored in the block list for the subblock, representing the maximum number of data bits used to encode the data in the subblock. If B zero bits are read, then the subblock contains only zero data and no entries are added to the block list (step 422). Note that no data values are written to the reconstructed data array in step 422 because there is no need to write zero data values to the reconstructed data array (see step 401 in FIG. 7). Steps 418, 420 and 422 are repeated until all four subblocks of the selected data block have been processed. After all subblocks of the selected block have been processed by steps 418–422, the pointer 356 to the next processed block (see FIG. 3) will be advanced by one position at step 414 if there are any unprocessed data blocks left in the block lisk (step 412).

If the size of the selected data block is the predefined minimum block size, such as 2×2 (step 416), all the values in the block are decoded and output to the reconstructed data array (steps 430, 432, 434, 436, 437).

The above described procedure continues until all the blocks in the block list are flagged as having been processed (step 412), at which point the encoding of the data analysis array is complete (step 440).

Data Compression Enhancements

In a preferred embodiment, to reduce the size of the encoded data produced, the encoding procedure shown in FIG. 5 is modified as follows. At step 384, when determining the maximum number of bits required to encode the last subblock of the currently selected block (h,w,k), if and only if the maximum number of bits required to encode each of the other three subblocks was less than B, the maximum number of bits required to encode data in the selected subblock, then it is known that at least one data value in the last subblock will require B bits to be encoded. In this case, the last subblock is added to the block list with a value of B denoted in the block list entry, but no data is added to the output.

In addition, at step 394, if the values for the first three data values in the selected block were all smaller than $2^{B-1}$, then the topmost "1" bit of the last data value is not output since the presence of that "1" can be implied.

In the decoder, steps 422 and 436 are modified as follows. In step 422, when the first three subblocks of the selected block have been processed and none have a Bit(i,j,k−1) value of B, then there is no data to read for the fourth subblock. Restated, if the maximum number of bits required to encode each of the first three subblocks was less than B, then there is no data to read for the fourth subblock. When this condition is detected, no encoded data is read for the fourth subblock, but nevertheless an entry for the fourth subblock is added to the block list with a specified maximum number of bits required to encode data in the subblock being set to B, which is the maximum number of bits required to encode data in the selected (parent) block.

In step 436, when the first data values in the selected block have been processed and all three have a value less than $2^{B-1}$, then the next data value to be read will have B−1 bits instead B bits, because its topmost bit is known to be equal to 1. When this condition is detected, B−1 bits of encoded data are read for the fourth data value in the selected block, a 1 bit is pre-pended (i.e., concatenated) to that value as the most significant bit, and then normal processing of the fourth data value resumes.

The data compression enhancement described above with respect to steps 384, 394, 422 and 436 of the encoder and decoder procedures typically reduces the amount of encoded output data produced by 2 to 3 percent. Thus data compression is improved by 2 to 3 percent.

Second Preferred Embodiment

Referring to FIGS. 4, 10, 11 and 12, in a second preferred embodiment the order of the encoding steps is modified so as to slightly reduce the number of bits used to encode the nodes in a data array. The same terminology (see Table 1) and data structures are used as in the first preferred embodiment, except that an additional list data structure called the node list data structure LN is used to keep track of a list of nodes. The beginning of the encoder procedure, as shown in FIG. 4 remains unchanged. However, the procedure for encoding a an array of $2^n \times 2^n$ data values shown in FIG. 5 is replaced by the procedure shown in FIGS. 10, 11 and 12.

Figure 10:
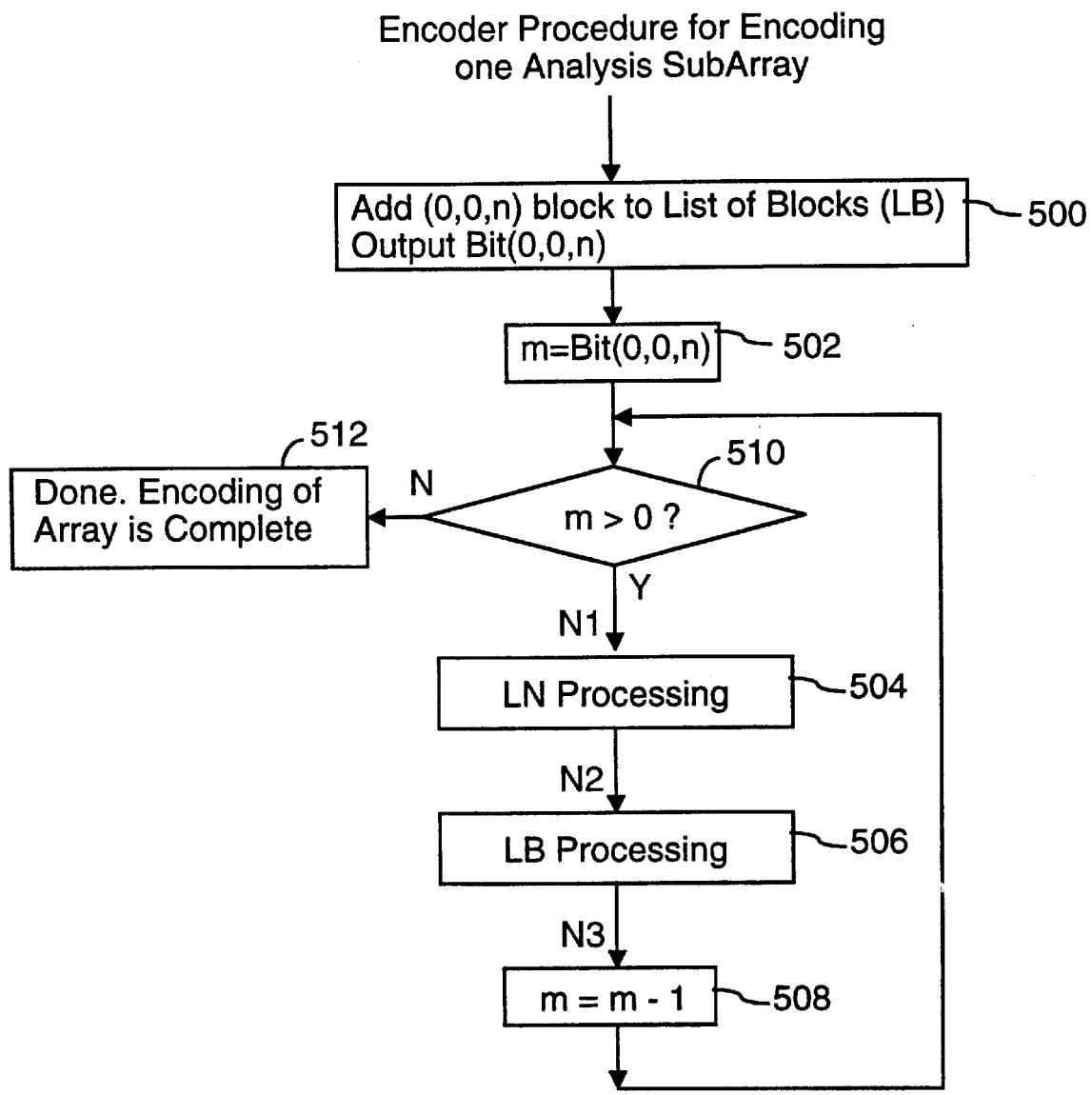
FIGS. 10, 11 and 12 are flow charts of a second preferred embodiment of the data encoding method of the present invention.

Referring to FIG. 10, the procedure for encoding an array of $2^n \times 2^n$ data values begins by putting a first entry, representing the entire $2^n \times 2^n$ analysis array, in the list of blocks (step 500). The list of blocks is empty except for this first entry. Also, at step 500 the encoding procedure determines the maximum number of bits required to encode any data value in the entire array being analyzed and outputs that value using a predefined number of bits (e.g., 4 bits).

A control variable m is then set to n, where n is equal to the number of bits required to encode the data sample with the largest absolute value in the entire specified set of data to be encoded (step 502). If the control variable m is initially equal to zero (step 510), that indicates that all the nodes in the array to be encoded are equal to zero, and therefore the encoding procedure is complete (step 512).

Next, using the current value of m, the LN processing procedure (step 504), and LB processing procedure (step 506) are called. These two procedures process and encode nodes and blocks with respect to whether or not data samples in those nodes and blocks have an absolute value greater than $2^{m-1}$. After executing these two procedures, the control variable m is decremented by 1 (step 508), and if m is still greater than zero (step 510), the two procedures are executed again (i.e., steps 504, 506 and 508 are repeated). This continues until m is decremented to a value of zero, at which point the encoding of the data array is complete (step 512).

Figure 11:
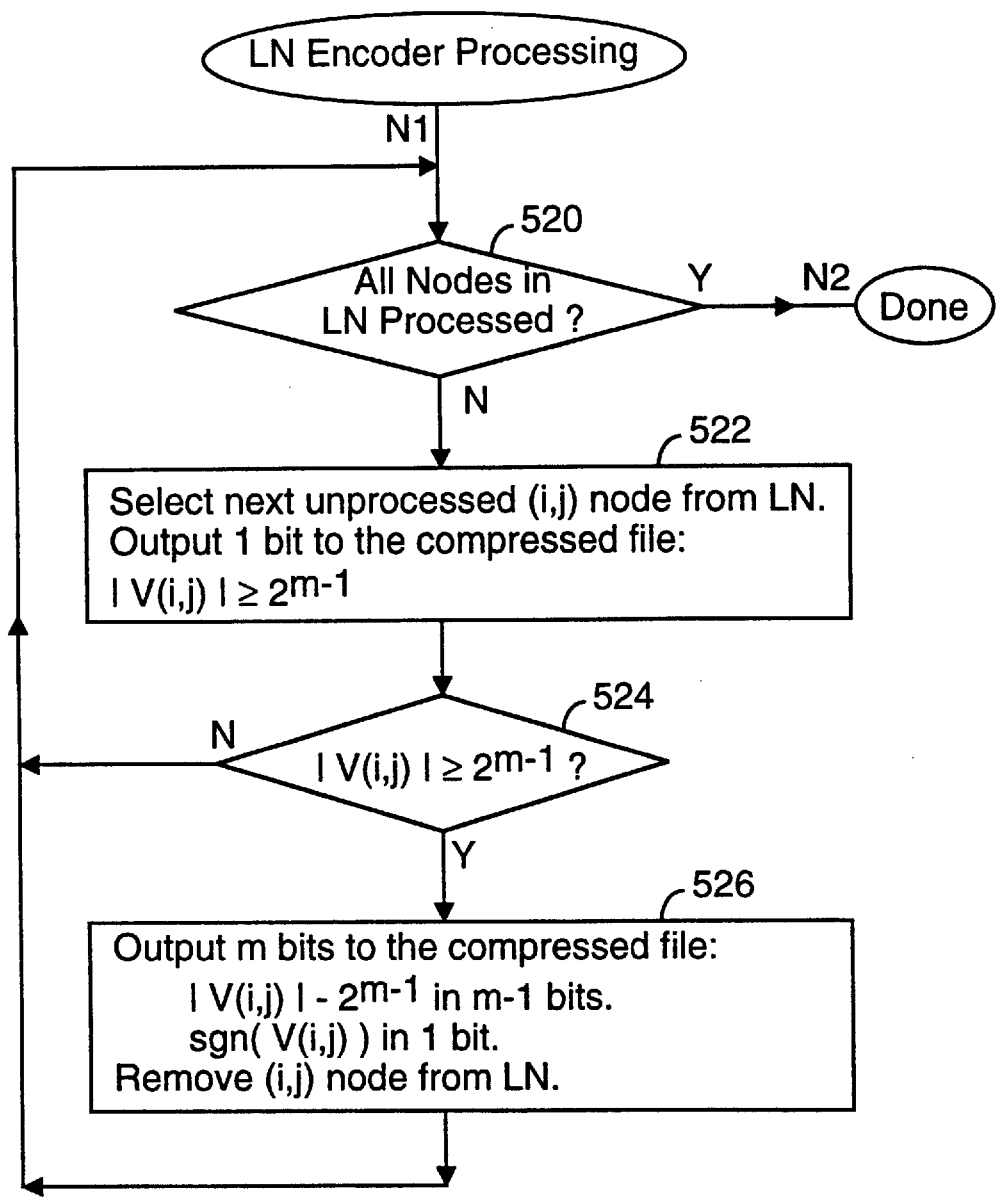

Referring to FIG. 11, the LN encoding processing procedure begins by determining if there are any unprocessed nodes in the list of nodes (step 520). Each time the LN processing procedure is called, the pointer 351 to the next unprocessed node is reset to the very first item in the list. The node list is initially empty when the encoding of each analysis array begins. At step 522 the next unprocessed node in the list of nodes is selected and one bit is output to indicate whether or not $|V(i,j)| \geq 2^{m-1}$. If $|V(i,j)| \geq 2^{m-1}$, a 1 bit is output and otherwise a 0 bit is output.

If the absolute value $|V(i,j)|$ of the selected node (i,j) is less than $2^{m-1}$ (i.e., if the bit value output in step 522 is 0, or equivalently if the $m^{th}$ least significant bit of $|V(i,j)|$ is not equal to 1) (step 524), then processing of the selected node is complete for the current iteration of the encoder procedure's processing loop. Otherwise, if the bit value output in step 522 for the current selected node is 1, the procedure outputs m bits, including m−1 bits that are set equal to $|V(i,j)|-2^{m-1}$ and 1 bit equal to sgn(V(i,j)), and furthermore the current selected node is removed from the list of nodes (step 526).

The LN processing procedure of FIG. 11 continues until all the nodes in the list of nodes have been processed. When the procedure is completed, the nodes previously in the list whose absolute value was greater than or equal to $2^{m-1}$ have been encoded and removed from the list of nodes, while for each of the other nodes in the list a "0" bit has been output to indicate that each of those nodes have an absolute value less than $2^{m-1}$.

Figure 12:
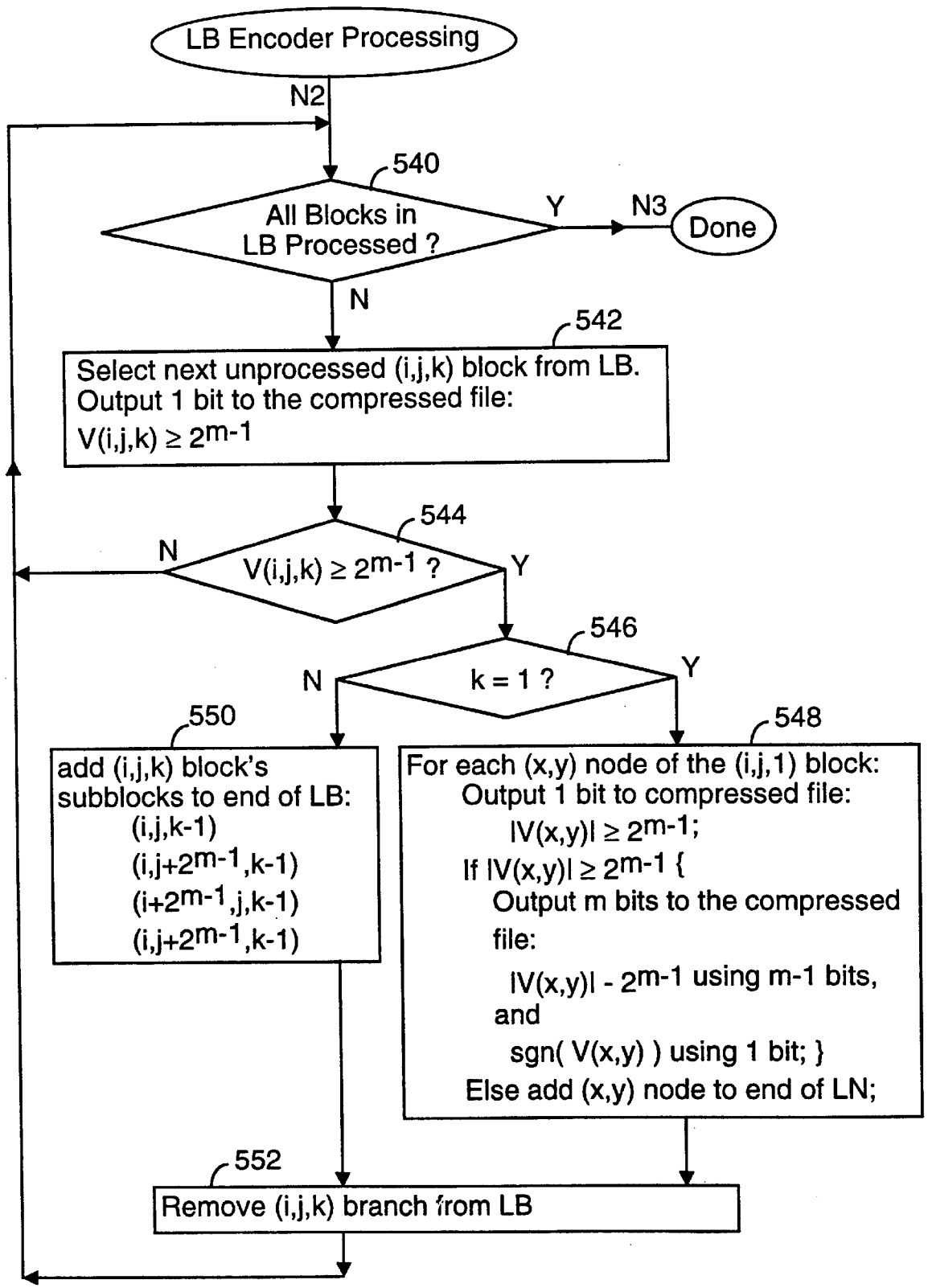

Referring to FIG. 12, the LB processing procedure begins by determining if there are any unprocessed blocks in the list of blocks (step 540). Each time the LB processing procedure is called, the pointer 356 to the next unprocessed block is reset to the very first item in the list. Therefore, unless the list is empty, step 540 will detect the presence of unprocessed blocks in the list when the LB processing procedure is first called. However, at step 500 (FIG. 10) the list of blocks is initialized to include one entry. At step 542 the next unprocessed block in the list of blocks is selected and one bit is output to indicate whether or not $V(i,j,k) \geq 2^{m-1}$. Thus, if there is at least one node in the (i,j,k) block whose absolute value is greater than or equal to $2^{m-1}$, a 1 bit is output and otherwise a 0 bit is output.

If the maximum absolute value of the nodes in the selected block $|V(i,j,k(|$ is less than $2^{m-1}$ (i.e., if the bit value output in step 542 is 0) (step 544), then processing of the selected block is complete for the current iteration of the encoder procedure's processing loop. Otherwise, if the bit value output in step 542 for the current selected block is 1, the selected block is processed further. In particular, if the block size is equal to or smaller than a predetermined minimum block size, such as 2×2, (step 546), all the data values in the block are processed in a predefined order, and each is either encoded or added to the end of the node list LN. For each data value V(x,y) in the (i,j,k) block, one bit is output to indicate whether or not $|V(x,y)| \geq 2^{m-1}$. Then, if the bit output for the data value is 1, indicating that $|V(x,y)| \geq 2^{m-1}$, another m bits are output to the compressed file, including m−1 bits that are set equal to $|V(x,y)|-2^{m-1}$ and 1 bit equal to sgn(V(x,y) ). For each node (x,y) in the block whose absolute value is less than $2^{m-1}$, a corresponding node identifier is added to the end of the list of nodes LN (step 548).

If the size of the selected data block is not equal to or smaller than the predefined minimum block size, such as 2×2 (step 546), the block is divided into four smaller blocks $(i,j,k-1)$, $(i,j+2^{k-1},k-1)$, $(i+2^{k-1},j,k-1)$, $(i+2^{k-1},j+2^{k-1},k-1)$ and block identifiers for those four blocks are added to the end of the list of blocks LB (step 550). After either step 548 or 550, the selected block is removed from the list of blocks LB (set 552).

The LB processing procedure of FIG. 12 continues until all the blocks in the list of blocks have been processed. When the procedure is completed, the blocks previously in the list that included at least one node whose absolute value was greater than or equal to $2^{m-1}$ have been removed from the list of blocks and divided into smaller blocks or divided into nodes that have been encoded or put on the node list, while for each of the other blocks in the list a "0" bit has been output to indicate that none of the nodes in those blocks have an absolute value greater than or equal to $2^{m-1}$.

The beginning of the decoder procedure in the second preferred embodiment, as shown in FIG. 7, is the same as in the first preferred embodiment. However, the procedure for decoding each analysis array of $2^n \times 2^n$ data values shown in FIG. 8 is replaced by the decoder procedures shown in FIGS. 13, 14 and 15.

Figure 13:
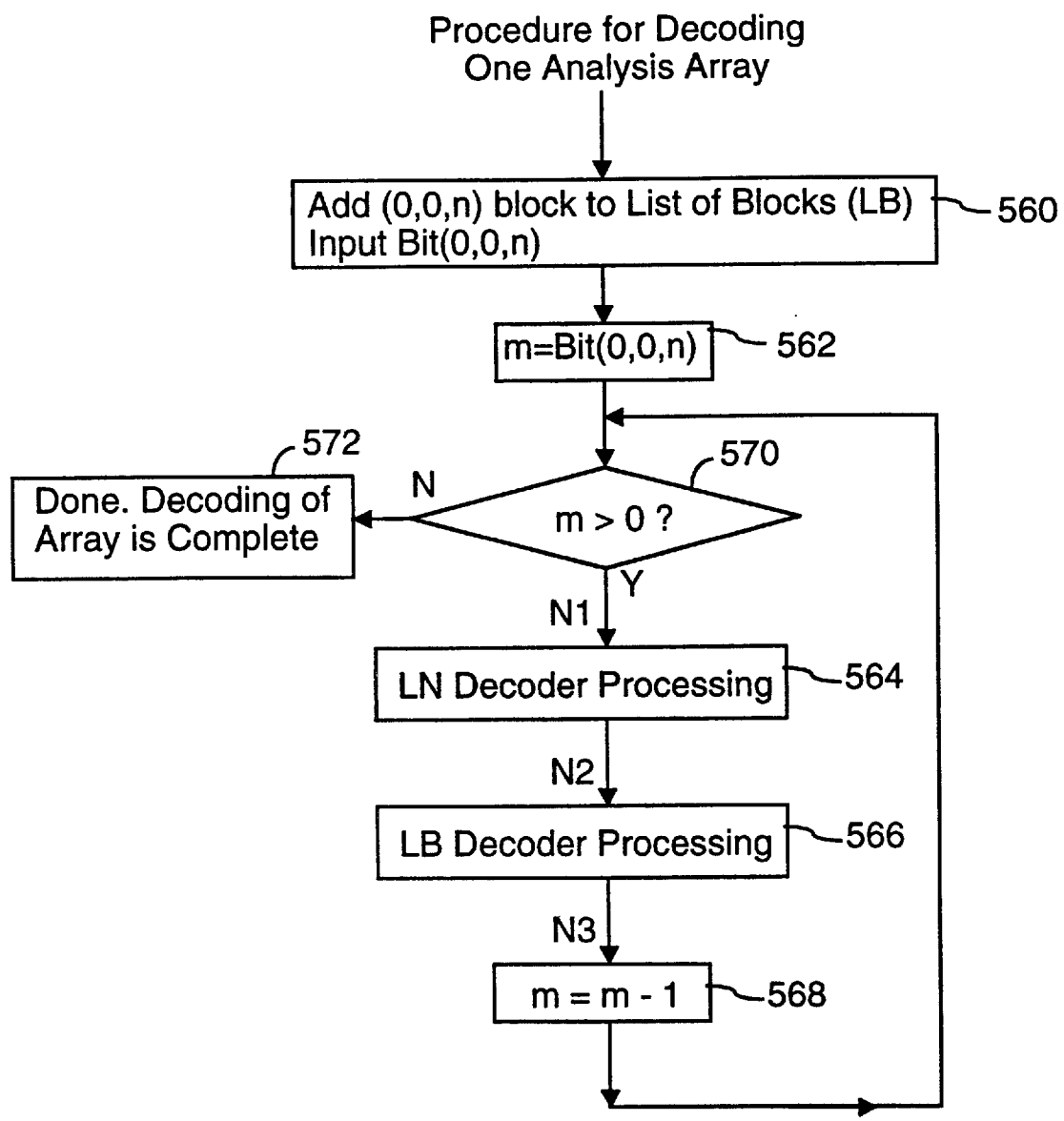
FIGS. 13, 14 and 15 are flow charts of a second preferred embodiment of the data decoding method of the present invention.

Referring to FIG. 13, the procedure for decoding an array of $2^n \times 2^n$ data values begins by putting a first entry, representing the entire $2^n \times 2^n$ analysis array, in the list of blocks (step 560). The list of blocks is empty except for this first entry. Also, at step 560 the encoding procedure inputs a value Bit(0,0,n) that indicates the maximum number of bits used to encode any data value in the entire array being decoded. If Bit(0,0,n) is equal to zero (step 570), that indicates that all the nodes in the array to be decoded are equal to zero, and therefore the decoding procedure is complete (step 572).

Otherwise, a control variable m is set to Bit(0,0,n) (i.e., the maximum number of bits used to encode the data sample with the largest absolute value in the entire specified set of data to be decoded) (step 562).

Next, using the current value of m, the LN decoding processing procedure (step 564), and LB decoding processing procedure (step 566) are called. These two procedures process and decode nodes and blocks with respect to whether or not data samples in those nodes and blocks have an absolute value greater than $2^{m-1}$. After executing these two procedures, the control variable m is decremented by 1 (step 568), and if m is still greater than zero (step 570), the two procedures are executed again (i.e., steps 564, 566 and 568 are repeated). This continues until m is decremented to a value of zero, at which point the encoding of the data array is complete (step 572).

Figure 14:
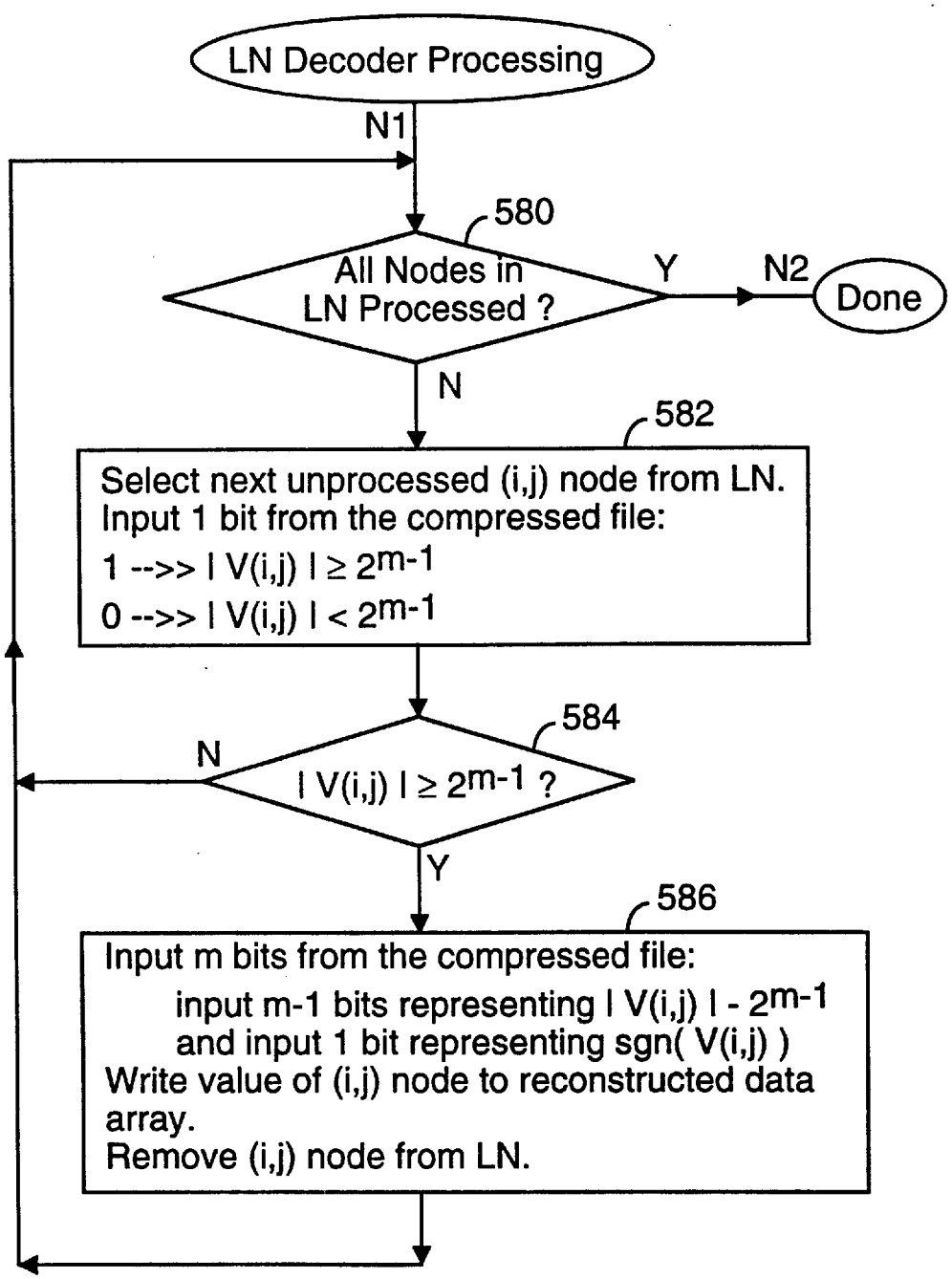

Referring to FIG. 14, the LN decoding processing procedure begins by determining if there are any unprocessed nodes in the list of nodes (step 580). Each time the LN processing procedure is called, the pointer 351 to the next unprocessed node is reset to the very first item in the list. The node list is initially empty when the decoding of each analysis array begins. At step 582 the next unprocessed node in the list of nodes is selected and one bit is input that indicates whether or not $|V(i,j)| \geq 2^{m-1}$. If $|V(i,j)| \geq 2^{m-1}$ a 1 bit is input and otherwise a 0 bit is input.

If the absolute value $|V(i,j)|$ of the selected node (i,j) is less than $2^{m-1}$ (i.e., if the bit value input in step 582 is 0, or equivalently if the $m^{th}$ least significant bit of $|V(i,j)|$ is not equal to 1) (step 584), then processing of the selected node is complete for the current iteration of the decoder procedure's processing loop. Otherwise, if the bit value input in step 582 for the current selected node is 1, the procedure inputs m additional bits, including m−1 bits that represent a value equal to $|V(i,j)|-2^{m-1}$ and 1 bit that represents sgn(V (i,j) ). The reconstructed node value is written to the reconstructed data array, and furthermore the current selected node is removed from the list of nodes (step 526).

The LN processing procedure of FIG. 14 continues until all the nodes in the list of nodes have been processed. When the procedure is completed, the nodes previously in the list whose absolute value was greater than or equal to $2^{m-1}$ have been decoded and removed from the list of nodes.

Figure 15:
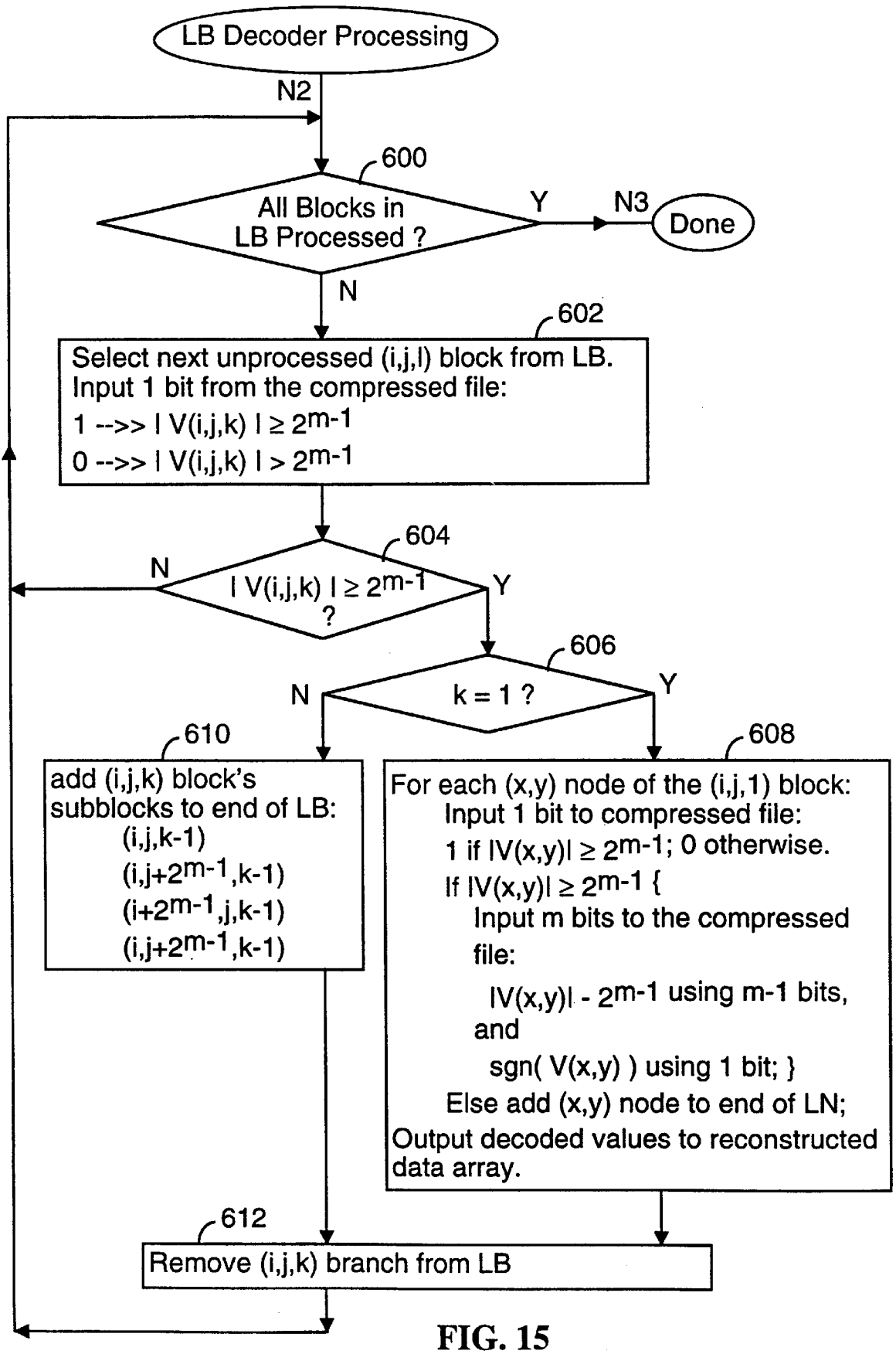

Referring to FIG. 15, the LB decoder processing procedure begins by determining if there are any unprocessed blocks in the list of blocks (step 600). Each time the LB processing procedure is called, the pointer 356 to the next unprocessed block is reset to the very first item in the list. Therefore, unless the list is empty, step 600 will detect the presence of unprocessed blocks in the list when the LB decoder processing procedure is first called. At step 602 the next unprocessed block in the list of blocks is selected and one bit is input that indicates whether or not $|V(i,j,k(| \geq 2^{m-1}$. Thus, if there is at least one node in the (i,j,k) block whose absolute value is greater than or equal to $2^{m-1}$, a 1 bit is input and otherwise a 0 bit is input.

If the maximum absolute value of the nodes in the selected block $|V(i,j,k(|$ is less than $2^{m-1}$ (i.e., if the bit value input in step 602 is 0) (step 604), then processing of the selected block is complete for the current iteration of the encoder procedure's processing loop. Otherwise, if the bit value input in step 602 for the current selected block is 1, the selected block is processed further. In particular, if the block size is equal to or smaller than a predetermined minimum block size, such as 2×2, (step 606), all the data values in the block are processed in a predefined order, and each is either decoded or added to the end of the node list LN. For each node (x,y) in the (i,j,k) block, one bit is input indicating whether or not $|V(x,y)| \geq 2^{m-1}$. Then, if the bit input for the node is 1, indicating that $|V(x,y)| \geq 2^{m-1}$, another m bits are input from the compressed file, including m−1 bits that represent a value of $|V(x,y)|-2^{m-1}$ and 1 bit representing sgn( V(x,y) ). For each node (x,y)in the block whose absolute value is less than $2^{m-1}$, a corresponding node identifier is added to the end of the list of nodes LN (step 608). In addition, the value of each node that has been fully decoded is output to the reconstructed data array.

If the size of the selected data block is not equal to or smaller than the predefined minimum block size, such as 2×2 (step 606), the block is divided into four smaller blocks $$(i,j,k-1), (i,j+2^{k-1},k-1), (i+2^{k-1},j,k-1), (i+2^{k-1},j+2^{k-1},k-1)$$

and block identifiers for those four blocks are added to the end of the list of blocks LB (step 610). After either step 608 or 610, the selected block is removed from the list of blocks LB (set 612).

The LB decoder processing procedure of FIG. 15 continues until all the blocks in the list of blocks have been processed. When the procedure is completed, the blocks previously in the list that included at least one node whose absolute value was greater than or equal to $2^{m-1}$ have been divided into smaller blocks or sets of nodes and removed from the list of blocks, while for each of the other blocks in the list a "0" bit has been output to indicate that none of the nodes in those blocks have an absolute value greater than or equal to $2^{m-1}$.

The second preferred embodiment normally generates the same amount of encoded data, but in a different order from the first preferred embodiment.

Alternate Embodiments

While the description of the invention above has generally indicated that a system using the invention would have both an encoder and decoder, it is anticipated that in many commercial embodiments only a small number of users or machines would include both an encoder and decoder, while large numbers of user or machines would include only a decoder. For instance, decoders in accordance with the present invention might be included in a library of image viewer procedures distributed to users of various World Wide Web browsers, while only users interested in sending or distributing images to other persons might license the use of the encoder.

Figure 9:
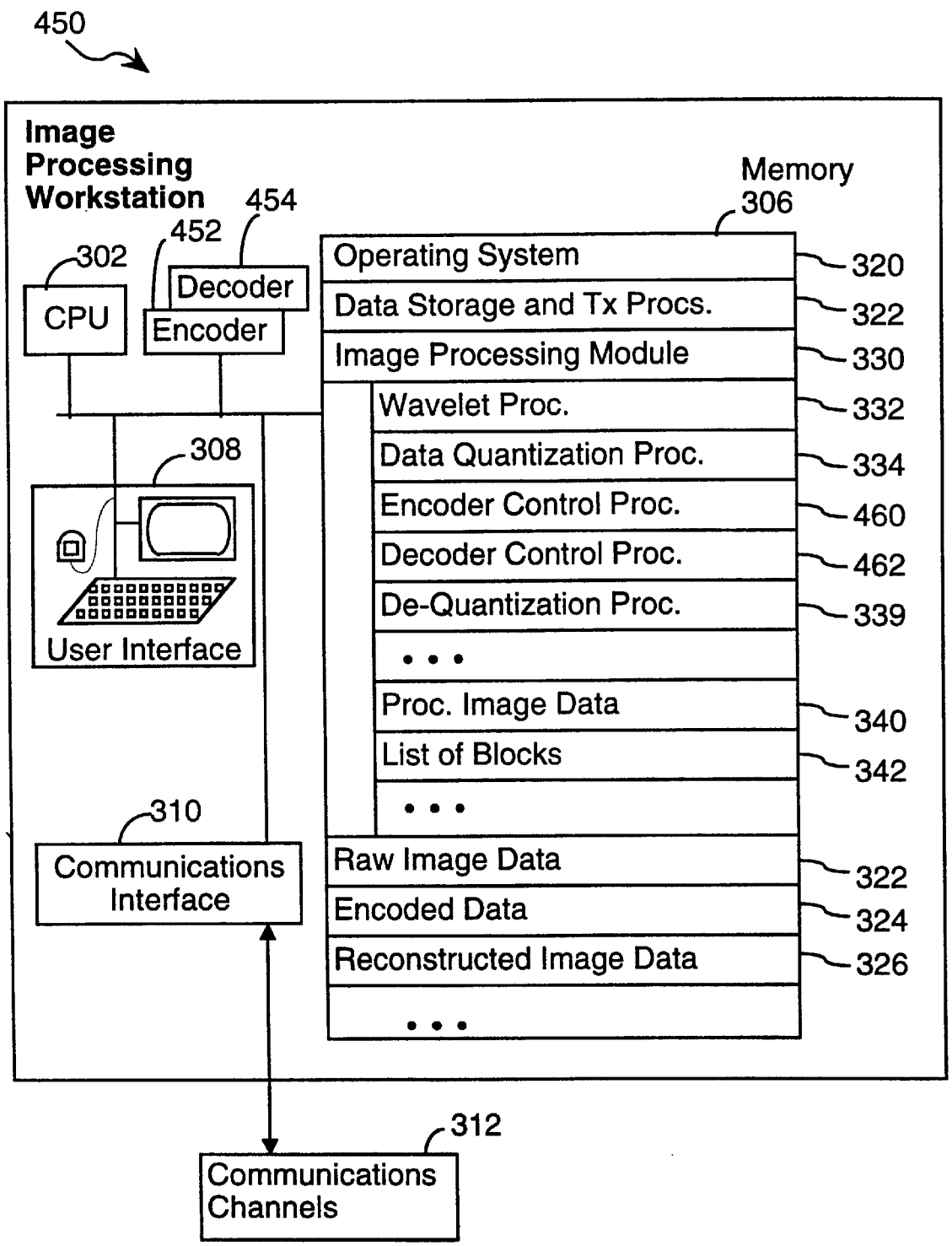
FIG. 9 is a block diagram of an image processing workstation incorporating a second preferred embodiment of the present invention.

Referring to FIG. 9, in an alternate embodiment, a image or other data processing workstation 450 contains the same components as described above with reference to the workstation 300 in FIG. 1, except that (A) the workstation includes an encoder/decoder circuit 452 for performing the encoding and decoding of N×N (e.g., 32×32) analysis arrays using hard coded logic circuitry, and (B) the encoder and decoder procedures are replaced by encoder and decoder control procedures 460, 462, which are shown in FIGS. 4 and 7, respectively.

In this second preferred embodiment, the sequence of encoding and decoding processing steps shown in FIGS. 5 and 8 are performed by hard coded logic circuitry 452 that includes a state machine to control the sequential data processing. The state of the state machine is updated at each step in accordance with the data being processed and the data values stored in and read from the block list.

The present invention is equally applicable to the encoding and decoding of three-dimensional data arrays, and in fact is applicable to the encoding and decoding of N-dimensional data arrays where N is an integer greater than 0. For instance, when encoding a three dimensional array, the data analysis array size might be set to 32×32×32. Each data block would have eight subblocks that is one eighth the size of its parent data block, and the minimum size data block would likely be 2×2×2 in size, with eight data values requiring encoding. Given this block sizing and subblock scheme, the encoding and decoding methods would remain unchanged in all other respects.

More generally, when successively identifying successively smaller data blocks, the number of data values contained in each identified data block (other than a block corresponding to the entire specified data array) will be equal to $2^{-N}$ times the number of data values in a corresponding parent data block, where N is an integer greater than zero. Thus, the encoding method could easily be modified so that the number of subblocks for each data block is two, or eight or sixteen, instead of the four used in the preferred embodiment, simply by redefining how each data block is to be divided into subblocks.

Further, the definition of the minimum size data block can be modified to be equal to any predefined number of data values, typically equal to an integer power of 2, and preferably equal to an integer power of 4. Thus, it would be easy to modify the encoding method to use minimum size data blocks of 16 data values by changing the decision at step 376 to test for k=2 (instead of k=1), and by generating sixteen output values in the block of the method for processing minimum size data blocks.

With respect to steps 370 and 378, 380, 382, 384 (of FIG. 5) for outputting values representing the bit length value for each identified data block, it would be possible to use alternate methods for outputting these bit length values, including encoding each data block's bit length value using entropy coding, such as Huffman or arithmetic coding.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding an image data array representing an image, comprising the steps of:

performing a predefined transformation on the image data array to generate a processed image data array;

dividing the processed image data array into a set of non-overlapping data array, wherein at least a plurality of the data arrays are each of a predetermined $2^N \times 2^N$ size, where N is an integer;

encoding each of the data arrays; the step of encoding each data array including:

successively identifying successively smaller blocks of data within the data array; wherein the data blocks are identified in a predefined order;

processing each identified data block by:

determining a maximum number of bits required to represent any single data value in the identified data block;

when the determined maximum number is equal to zero, outputting data indicating the identified data block contains only zero values;

when the determined maximum number is not equal to zero, and the identified data block contains more than a predefined threshold number of data values, outputting data indicating the determined maximum number; and when the determined maximum number is not equal to zero, and the identified data block does not contain more than the predefined threshold number of data values, outputting data representing each of the data values in the identified data block;

wherein the data output by the method is output in an order corresponding to the predefined order that data blocks are identified.

2. The method of claim 1, wherein each identified block contains a number of data values;

the number of data values contained in each identified data block other than a block corresponding to all of the data array is equal to $2^{-N}$ times the number of data values in a corresponding parent data block, where N is an integer greater than zero.

3. The method of claim 1, including the identifying step including storing, on a list data block entries, a data block entry representing each identified data block that contains at least one non-zero value;

wherein the data block entries are stored on the data block list in the predefined order;

the processing step including selecting a data block from the data block list and then processing that selected data block, such that data blocks are processed by the processing step in the predefined order.

4. The method of claim 3, the data block entry storing step including, storing for each data block entry a bit length value indicating the determined maximum number of bits required to represent any single data value in the data block corresponding to the data block entry; and the step of outputting data representing each of the data values in the identified data block including reading the stored bit length value corresponding to the identified data block and encoding each data value with a number of data bits corresponding to the read bit length value.

5. The method of claim 4, the step of storing for each data block entry a bit length value including:

when the data block is the entire data array being encoded, storing the bit length value;

when the data block is smaller than entire data array being encoded and has a corresponding parent data block, determining a difference between the bit length value of the parent data block and the bit length value of the data block, and storing a value corresponding to the determined difference in bit length values.

6. The method of claim 5, the step of storing the bit length difference value including:

when the bit length difference value is less than the bit length value of the parent data block, storing a first number of data bits each equal to a first predefined binary value, where the first number corresponds to the bit length difference value, followed by one bit equal to a second predefined binary value that is different from the first predefined binary value; and when the bit length difference value is equal to the bit length value of the parent data block, only storing the first number of bits each equal to the first predefined binary value.

7. A computer program product for use in conjunction with a computer system, the computer program product comprising a computer readable storage medium and a computer program mechanism embedded therein, the computer program mechanism comprising:

a data transform procedure for performing a predefined transformation on an image data array to generate a processed image data array; and a data encoding procedure, the data encoding procedure including instructions for:

dividing the processed image data array into a set of non-overlapping data arrays, wherein at least a plurality of the data arrays are each of a predetermined $2^N \times 2^N$ size, where N is an integer; and processing each of the data arrays by successively identifying successively smaller blocks of data within the data array; wherein the data blocks are identified in a predefined order;

the data encoding procedure further including instructions for processing each identified data block, by:

determining a maximum number of bits required to represent any single data value in the identified data block;

when the determined maximum number is equal to zero, outputting data indicating the identified data block contains only zero values;

when the determined maximum number is not equal to zero, and the identified data block contains more than a predefined threshold number of data values, outputting data indicating the determined maximum number; and when the determined maximum number is not equal to zero, and the identified data block does not contain more than the predefined threshold number of data values, outputting data representing each of the data values in the identified data block;

wherein the data output by the data encoding procedure is output in an order corresponding to the predefined order that data blocks are identified.

8. The computer program product of claim 7, wherein each identified block contains a number of data values;

the number of data values contained in each identified data block other than a block corresponding to all of the data block is equal to $2^{-N}$ times the number of data values in a corresponding parent data block, where N is an integer greater than zero.

9. The computer program product of claim 7, wherein the data encoding procedure includes:

instructions for storing, on a data block list, a data block entry representing each identified data block that contains at least one non-zero value; wherein the data block entries are stored on the data block list in the predefined order; and instructions for selecting a data block from the data block list and then processing that selected data block, such that data blocks are processed by the processing step in the predefined order.

10. The computer program product of claim 7, wherein the data block entry storing instructions include instructions for storing for each data block entry a bit length value indicating the determined maximum number of bits required to represent any single data value in the data block corresponding to the data block entry; and the data outputting instructions include instructions for reading the stored bit length value corresponding to the identified data block and encoding each data value with a number of data bits corresponding to the read bit length value.

11. The computer program product of claim 10, the data block entry storing instructions including instructions for storing the bit length value when the data block is the entire data array being encoded, and instructions for determining a difference between the bit length value of a corresponding parent data block and the bit length value of the data block, and for storing a value corresponding to the determined difference in bit length values when the data block is smaller than entire data array being encoded.

12. The computer program product of claim 11, the bit length difference determining and storing instructions including:

instructions for determining whether the bit length difference value is less than the bit length value of the parent data block, and when the determination is positive for storing a first number of data bits each equal to a first predefined binary value, where the first number corresponds to the bit length difference value, followed by one bit equal to a second predefined binary value that is different from the first predefined binary value; and and instructions for storing only the first number of bits each equal to the first predefined binary value when the determination is negative.

13. A method of decoding encoded data representing a image data array, comprising the steps of:

reconstructing a processed image data array by decoding subsets of the encoded data, each subset representing a portion of the processed image data array; and performing a predefined transformation on the reconstructed processed image data array to generate a reconstructed image data array;

the step of decoding a subset of the encoded data comprising:

(A) successively reading data bists of the encoded data, the read data bits representing information about a sequence of successively smaller blocks of data within a respective portion of the proccessed image data array, and in accordance with a predefined data block processing sequence identifying data blocks corresponding to subsets of the read data bits;

(B) processing the subset of read data bits for each identified data block by:

(B1) when the identified data block contains more than a predefined threshold number of data values, (B1a) interpreting the subset of read data bits to determine, for each of a plurality of smaller data blocks contained within the identified data block, a bit length value corresponding to a maximum number of bits used to represent any single data value in the smaller data block; and (B1b) for each of the smaller data blocks:

(B1b1) when the bit length value for the smaller data block is equal to zero, outputting to a reconstructed data array null data values at positions corresponding to the smaller data block; and (B1b2) when the bit length value is not equal to zero, temporarily storing bit length data associated with the smaller data block that corresponds to the bit length value; and (B2) when the identified data block does not contain more than the predefined threshold number of data values, interpreting the subset of read data bits in accordance with the bit length data stored for the identified data block to reconstruct the predefined number of data values and outputting the reconstructed data values to the reconstructed data array at positions corresponding to the identified data block.

14. The method of claim 13, wherein each identified block contains a number of data values;

the number of data values contained in each identified data block other than a block corresponding to all of the respective portion of the processed image data array is equal to $2^{-N}$ times the number of data values in a corresponding parent data block, where N is an integer greater than zero.

15. The method of claim 13, including the identified step including storing, on a data block list a data block entry representing each identified data block that contains at least one non-zero value; wherein the data block entries are stored on the data block list in an order consistent with the predefined data block processing sequence;

the processing step including selecting a data block from the data block list and then reading and processing data bits from the encoded data corresponding to the selected data block, such that blocks are processed by the processing step in an order consistent with the predefined data block processing sequence.

16. The method of claim 15, the data block entry storing step including, storing for each data block entry the determined bit length value for the data block corresponding to the data block entry; and the step B2 including reading the stored bit length value corresponding to the identified data block and decoding the read data bits in accordance with the read bit length value for the identified data block.

17. The method of claim 16, the step of reading the stored bit length value corresponding to the identified data block including:

when the data block is the entire respective portion of the processed image data array, reading the bit length value;

when the data block is smaller than entire respective portion of the precessed image data array and has a corresponding parent data block, reading a difference value corresponding to a difference between the bit length value of the parent data block and the bit length value of the data block, and determining a corresponding bit length value for the identified data block by subtracting the difference value from a previously determined bit length value for the corresponding parent data block.

18. The method of claim 17, the step of reading the stored bit length difference value including:

when the bit length difference value is less than the bit length value of the corresponding parent data block, reading a first number of data bits each equal to a first predefined binary value, where the first number corresponds to the bit length difference value, followed buy one bit equal to a second predefined binary value that is different from the first predefined binary value; and when the bit length difference value is equal to the bit length value of the parent data block, only reading the first number of bits each equal to the first predefined binary value.

19. A computer program product for use in conjunction with a computer system, the computer program product comprising a computer readable storage medium and a computer program mechanism embedded therein, the computer program mechanism comprising:

(A) a data decoding procedure, the data decoding procedure including instructions for reconstructing a processed image data array by decoding subsets of the encoded data, each subset representing a portion of the processed image data array; the data decoding procedure including instructions for decoding a subset of the encoded data by successively reading data bits of the encoded data, the read data bits representing information about a sequence of successively smaller blocks of data within a respective portion of the processed image data array, and in accordance with a predefined data block processing sequence identifying data blocks corresponding to subsets of the read data bits;

(B) the data decoding procedure further including instructions for processing the subset of read data bits for each identified data block by:

(B1) when the identified data block contains more than a predefined threshold number of data values, (B1a) interpreting the subset of read data bits to determine, for each of a plurality of smaller data blocks contained within the identified data block, a bit length value corresponding to a maximum number of bits used to represent any single data value in the smaller data block; and (B1b) for each of the smaller data blocks:

(B1b 1) when the bit length value for the smaller data block is equal to zero, outputting to a reconstructed data array null data values at positions corresponding to the smaller data block; and (B1b2) when the bit length value is not equal to zero, temporarily storing bit length data associated with the smaller data block that corresponds to the bit length value; and (B2) when the identified data block does not contain more than the predefined threshold number of data values, interpreting the subset of read data bits in accordance with the bit length data stored for the identified data block to reconstruct the predefined number of data values and outputting the reconstructed data values to the reconstructed data array at positions corresponding to the identified data block; and (C) a transformation procedure for performing a predefined transformation on the reconstructed processed image data array to generate a reconstructed image data array.

20. The computer program product of claim 19, wherein each identified block contains a number of data values;

the number of data values contained in each identified data block other than a block corresponding to all to the data block is equal to $2^{-N}$ times the number of data values in a corresponding parent data block, where N is an integer greater than zero.

21. The computer program product of claim 19, wherein the data decoding procedure includes:

instructions for storing, on a data block list, a data block entry representing each identified data block that contains at least one non-zero value; wherein the data block entries are stored on the data block list in an order consistent with the predefined data block processing sequence; and instructions for selecting a data block from the data block list an then reading and processing data bits from the encoded data corresponding to the selected data block, such that data blocks are processed by the processing step in an order consistent with the predefined data block processing sequence.

22. The computer program product of claim 21, wherein the data block entry storing instructions include instructions for storing for each data block entry the determined bit length value for the data block corresponding to the data block entry; and the B2 instructions including instructions for reading the stored bit length value corresponding to the identified data block and decoding the read data bits in accordance with the read bit length value for the identified data block.

* * * * *